(12) United States Patent
Higuchi et al.

(10) Patent No.: US 6,227,768 B1
(45) Date of Patent: May 8, 2001

(54) PARTICULATE CONVEYOR DEVICE AND APPARATUS

(75) Inventors: Fumii Higuchi; Joseph C. Barbisan, both of Mississauga (CA); Paul M. Wegman, Pittsford, NY (US); John L. Haack, Milford, CT (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/409,193

(22) Filed: Sep. 30, 1999

(51) Int. Cl.[7] ................................................. B65G 51/18
(52) U.S. Cl. .............................. 406/89; 406/191; 138/114
(58) Field of Search ...................... 406/191, 89; 138/114, 138/113

(56) References Cited

U.S. PATENT DOCUMENTS

| | | | |
|---|---|---|---|
| 3,680,684 | 8/1972 | Purdy et al. ........................ | 198/230 |
| 4,116,491 | * 9/1978 | Ply ..................................... | 302/29 |
| 5,560,875 | 10/1996 | Meshengisser et al. ........... | 261/122.1 |
| 5,562,366 | * 10/1996 | Paulson .............................. | 406/191 |
| 5,722,802 | * 3/1998 | March ................................ | 138/113 |
| 5,827,370 | * 10/1998 | Gu ..................................... | 138/114 |
| 5,888,391 | 3/1999 | Meshengisser et al. ............. | 210/220 |
| 5,988,234 | * 11/1999 | Wegman ............................. | 141/67 |

\* cited by examiner

Primary Examiner—Christopher P. Ellis
Assistant Examiner—Joe Dillon, Jr.
(74) Attorney, Agent, or Firm—John L. Haack (57) ABSTRACT

A device for use in transporting particulate materials including: a conduit adapted for transporting particulate material from the first end to the second end of the conduit via an interior hollow chamber; a gas impermeable outer wall; a gas permeable inner wall; a compressed gas inlet nozzle which traverses the outer wall; a gas distribution chamber situated between the outer wall and the inner wall; and a gas pressure source attached to the gas inlet nozzle which conveys gas to the gas distribution chamber and through the gas permeable inner wall.

19 Claims, 4 Drawing Sheets

PARTICULATE CONVEYOR DEVICE AND APPARATUS

CROSS REFERENCE TO COPENDING APPLICATIONS AND RELATED PATENTS

Attention is directed to commonly owned and assigned U.S. Pat. No. 5,685,348, issued Nov. 11, 1997, entitled "ELECTROMAGNETIC FILLER FOR TONER"; U.S. Pat. No. 5,699,842, issued Dec. 23, 1997, entitled "MAGNETIC FILLING AND MIXING APPARATUS AND PROCESSES THEREOF"; and U.S. Pat. No. 5,921,295, issued Jun. 13, 1999, entitled "HIGH SPEED NOZZLE FOR TONER FILLING."

Attention is directed to commonly assigned copending applications: U.S. Ser. No. 09/061,122, filed Apr. 16, 1998, now U.S. Pat. No. 5,982,234, issued Nov. 23, 1999, entitled "APPARATUS FOR PARTICULATE PROCESSING" which discloses an apparatus including a funnel comprising a housing operably connected to a particulate source at one end and extending downwardly therefrom to a receiver member at the other end, the funnel being adapted to permit a flow of powder therethrough, and wherein the inner wall of the funnel is adapted with a porous member which provides a boundary layer of gas between the porous member and the powder; U.S. Ser. No. 09/173,415, filed Oct. 15, 1998, now U.S. Pat. No. 6,024,141, issued Feb. 15, 2000, entitled "Particulate Processing Apparatus", An apparatus including: a conduit operably connected to a source and extending downwardly therefrom, the conduit being adapted to permit a flow of particulate material from the source through the conduit; a fluidizing nozzle operably connected to the conduit and extending downwardly therefrom, the nozzle defining an inlet for receiving material from the conduit and defining an outlet for dispensing material from the nozzle to a receiver, the inlet defining an inlet cross sectional area perpendicular to the flow the material and outlet defining an outlet cross sectional area perpendicular to the flow the material, the inlet cross sectional area being larger than the outlet cross sectional area; the nozzle being adapted with a plenum including an inlet port for receiving compressed gas and a chamber adapted to communicate the gas to the porous walls of the nozzle, and an outlet port for engaging a vacuum source to continuously evacuate the receiver while the nozzle is engaged with the receiver; a conveyor located at least partially within the conduit, the conveyor assisting to provide the flow of material from the source to the receiver, and an electromagnetic valve located adjacent to at least a portion of the conduit, the electromagnetic valve being adapted to supply a magnetic force to the material in the conduit until a second receiver replaces the first receiver, the magnetic force being sufficient to restrict or stop the material flow through the nozzle; and U.S. Ser. No. 09/173,395, filed Nov. 10, 1998, now U.S. Pat. No. 6,021,821, issued Feb. 8, 2000, entitled "Particulate Processing Apparatus" which discloses an apparatus including: a conduit operably connected to a source and extending downwardly therefrom, the conduit being adapted to permit a flow of particulate material from the source through the conduit; a fluidizing nozzle operably connected to the conduit and extending downwardly therefrom, the nozzle defining an inlet for receiving material from the conduit and defining an outlet for dispensing material from the nozzle to a receiver, the inlet defining an inlet cross sectional area perpendicular to the flow of the material and outlet defining an outlet cross sectional area perpendicular to the flow of the material, the inlet cross sectional area being larger than the outlet cross sectional area; the nozzle being adapted with a plenum including an inlet port for receiving compressed gas and a chamber adapted to communicate the gas to the porous walls of the nozzle, and an outlet port for engaging a vacuum source to continuously evacuate the receiver while the nozzle is engaged with the receiver; a conveyor located at least partially within the conduit, the conveyor assisting the flow of material from the source to the receiver; and a liner member residing on to at least a portion of the inner surface of said conduit and adjacent to said nozzle.

The disclosures of each of the above mentioned patents and copending applications are incorporated herein by reference in their entirety. The appropriate components and processes of these patents may be selected for the toners and processes of the present invention in embodiments thereof.

BACKGROUND OF THE INVENTION

This invention relates generally to apparatuses and methods for controllably and accurately conveying particulate materials. More specifically the invention concerns reliably conveying particulate materials from a particulate source container, such as a toner hopper, to subsequent unit operation process equipment. As an illustrative example, receiving receptacles on a fill line conveyor belt can receive particulates such as toner from a supply hopper by transport through a particulate conveyor article of the present invention and thereafter to a receiving manifold and subsequently to the toner receptacles. Other receivers can include a particulate mixer or formulating device, or a melt mixer or extruder device. The invention can be accomplished by fluidizing particulate materials and thereafter directing the resulting fluidized particulates to a fluidizing conveyor or conduit. The inner walls of the fluidizing conveyor article are highly porous, that is micro-porous, and permit a continuous stream of compressed gas to permeate the inner wall and into the interior cavity of the conduit to provide enhanced flow properties to the particulate materials.

A variety of particulate materials can be readily transported with the particulate conveyor apparatus of the present invention, for example, polymer particles and aggregates thereof such as lattices, toner particles, fine particle surface additives, such as hydrophilic or hydrophobic metal oxide particles, non magnetic particles, magnetic particles, fine powdered materials, such as food stuffs and pharmaceuticals, and mixtures thereof.

In embodiments the conveyor apparatus of the present invention can include: an optional fluidizing module for fluidizing otherwise non-fluid particulates received from a particle feed source; a fluidizing conduit article with gas permeable walls for fluidizing and controllably transporting the particulates from the source area or fluidizing area to an ultimate receiver vessel or subsequent unit operation; an optional receiver module for receiving the particulates from the fluidizing conduit article and to permit appropriate depressurization of the fluidized particulate stream; and optionally a low surface tension liner material in at least some portions of the fluidizing conduit which assists in the transport of particulates from the source to the receiver, for example, at connection points between the source or fluidizing module and the conduit, or between the conduit the receiver module. The low-friction low-surface tension or "non-stick" liner material further ensures continuous and non-blocking flow of particulate materials into, through, and out of the conduit article enabling smooth delivery of material and trouble free operation of the conveyor apparatus. The fluidizing conduit article or conveyor article of the present invention in conjunction with the particulate conveyor apparatus can provide exceptionally reliable particulate transport where, for example, clogging or particle flow inhibition of throughput rates are very low or eliminated; and high fill rates, high fill densities, and clean operation are consistently obtained. The article and apparatus provide for smooth, continuous flow, and high throughput of particulate materials.

The apparatus and method of the present invention solves important particulate transport problems and provides various advantages including: greatly reduced time required to transport particulate materials to receiving vessels in a continuous manner; and reduced downtime for blockage or leakage problems associated with continuous particle transport operations.

The apparatus and method of the present invention also prevents or greatly reduces wear of the conduit when abrasive particulates, such as magnetic particles and related abrasive particulates, are continuously conveyed and at high throughput velocities.

Problems associated with, for example, controlling the handling and filling of toner containers are largely attributable to the properties of the toner. Toner is the image-forming material in a developer which when deposited by the field of an electrostatic charge becomes the visible record. There are two main types of developing systems known as one-component and two-component systems. In one-component developing systems, the developer material is toner comprised of particles of magnetic material, usually iron, embedded in a black plastic resin. The iron enables the toner to be magnetically charged. In two-component systems, the developer material is comprised of toner of polymer or resin particles and a colorant, and a carrier of roughly spherical particles or beads usually made of steel. An electrostatic charge between the toner and the carrier bead causes the toner to cling to the carrier in the development process. Control of the flow of these small, abrasive and easily charged particles is very difficult. The one-component and two-component systems utilize toner that can be difficult to flow controllably. This is particularly true of the toner used in two component systems. The toner tends to cake and bridge within the hopper. This limits the flow of toner through the small tubes used for addition of the toner through the opening of the toner container. Also, this tendency to cake and bridge may cause air gaps to form in the container resulting in incorrect or partial filling of the container.

Attempts to improve the flow of toner and related particulate materials have also included the use of an external vibrating device to loosen the toner within the hopper and in conventional conduit conveyors. These vibrators are energy intensive, costly and not entirely effective and consistent. Other difficulties are also apparent in quickly starting and stopping the flow of toner from a hopper when filling a container with toner in a high speed production filling operation. A non-invasive electromagnetic toner valve in conjunction with an internal screw auger drive transport system has been developed and is described in the U.S. Pat. Nos. 5,685,348 and 5,839,485, the disclosures of which are incorporated herein by reference in their entirety.

PRIOR ART

In U.S. Pat. No. 5,888,391, issued Mar. 30, 1999, to Meshengisser, et al., there is disclosed an aerating device comprised of an air conduit assembled from a plurality of aerating modules tightly held together. Each of the aerating modules comprises an annular disperser and a sectional tubular member on which the disperser is horizontally cantilevered in the area where the components of the tubular member are held together and with which it communicates by compressed air. The disperser has a seating ring provided with a hole for compressed air to pass, the axis of the hole being misaligned with respect to the axis of the annular disperser, and a dispersing member defining, together with the seating ring, an annular space wherein a ring-shaped throttling member is fixed place. The disperser is capable of performing setting-up motions round the vertical axis of the hole in the seating ring and is provided with device for its being held rigidly to the sectional tubular member, which device has a vertical passage coaxial with the holes in the seating ring. The flow passage area of the throttling member equals from 0.15 to 1.0 the cross-sectional area of the vertical passage, and the ratio between the outside diameter of the annular disperser and the hole diameter is from 1.5 to 2.6.

In U.S. Pat. No. 5,560,875, issued Oct. 1, 1996, to Meshengisser, et al., there is disclosed an aerating device comprised of a tubular air conduit whose external surface of the side wall is provided with longitudinal ribs alternating with longitudinal recesses and is covered with a two-layer dispersing coating. The first (internal) layer of the dispersing coating is made as a fibrilliform filament wound on the external surface of the air conduit with a surface density of 1.1–2.0 kg/sq. m, the second (external) layer of the dispersing coating is a porous envelop made of material with chaotically laid fibers of a diameter from $6 \times 10^{-5}$ to $21 \times 10^{-5}$ m fused at the points of their intersection and applied to the internal layer with a density of $3.5 \times 10^2$ to $6.0 \times 10^2$ kg/cu m. The side wall of the air conduit at the point of each recess has a number of radial holes, each having a diameter (d) varying from 0.05 to 0.12 the inside diameter (D) of the tubular air conduit.

In U.S. Pat. No. 3,680,684, issued Aug. 1, 1972, to Purdy, et al., there is disclosed a method and apparatus for removing particulate matter retained by a conveyor belt including a belt-cleaning station disposed transverse to the belt width. The cleaning equipment comprises plural orifices for directing a stream of compressed air across the width of the belt to dislodge the retained particles, and nested communication conduits through which suction is applied for capturing and removing the particles dislodged from the belt.

The disclosures of the above mentioned patents are incorporated herein by reference in their entirety.

There exists a need for simple and efficient particulate transport devices, apparatuses, and transport methods thereof, which overcome problems and deficiencies of the prior art.

SUMMARY OF THE INVENTION

Embodiments of the present invention, include:

Overcoming or minimizing problems encountered in the art by providing particulate handling and filling equipment, which enables improved manufacturing efficiency and material throughput;

An article comprising:
- a conduit adapted for transporting particulate material from the first end to the second end of the conduit via an interior hollow chamber, including:
- a gas impermeable outer wall;
- a gas permeable inner wall;
- a compressed gas inlet nozzle which traverses the outer wall;

a gas distribution chamber situated between the outer wall and the inner wall; and a gas pressure source attached to the gas inlet nozzle which communicates gas pressure to the gas distribution chamber and the gas permeable inner wall; and An apparatus comprising:

a particulate source;

a fluidizing conduit article as described above, in communication with the particulate source; and a receiver module in communication with the fluidizing conduit adapted to receive the particulates from the conduit article and to optionally further condition the particle stream.

These and other aspects are achieved, in embodiments, of the present invention as described and illustrated herein.

BRIEF DESCRIPTION OF THE DRAWINGS

FIG. 1 illustrates a cross-section of an exemplary fluidizing conduit article of the present invention.

FIG. 2 illustrates a perspective of an exemplary substantially horizontal conveyor system of the present invention incorporating the fluidizing conduit article of FIG. 1.

FIG. 3 illustrates a perspective of an exemplary vertically inclined conveyor system of the present invention incorporating the fluidizing conduit article of FIG. 1.

FIG. 4 illustrates a partial perspective of an exemplary conveyor system of the present invention incorporating a plurality of fluidizing conduit articles of FIG. 1.

DETAILED DESCRIPTION OF THE INVENTION

The present invention in embodiments provides:

An article comprising:

a conduit adapted for transporting particulate material from the first end to the second end of the conduit via an interior hollow chamber, including:

a gas impermeable outer wall;

a gas permeable inner wall;

a compressed gas inlet nozzle which traverses the outer wall;

a gas distribution chamber situated between the outer wall and the inner wall; and a gas pressure source attached to the gas inlet nozzle which communicates gas pressure to the gas distribution chamber and the gas permeable inner wall and thereafter to the interior transport cavity of the conduit.

The interior gas permeable wall of the conduit can be constructed of any suitable porous material, for example, porous resins, sintered metal oxides, a gas permeable powdered metal, and the like porous materials. The gas permeable inner wall can be a microporous material such as a porous polymer, a powdered metal, a microscopically perforated metal, a microscopically perforated plastic sheet, a microscopically perforated cellulose sheet material, and the like formable sheet materials, a sintered metal oxide, and combinations thereof. A particularly preferable porous materials is POREX® a highly porous, high density polyethylene material commercially available from Porex Technologies, 500 Bohannon Road, Fairbum, Ga. 30213-2828.

The external gas pressure traverses the gas permeable inner wall and thereafter is directed towards the interior chamber of the conduit to assist the transport of the resident or entrained particulate materials. The gas pressure can urge the particulate material in the interior hollow chamber through the conduit. Additionally, the gas pressure traversing the inner wall can form a gaseous substantially frictionless boundary layer between the gas permeable inner wall and the particulate materials within the interior hollow chamber of the article.

In embodiments, the microporous material can typically consist of micropores with an average diameter of from about 7 to about 250 microns.

The average diameter of the micropores in the microporous material can be larger, smaller, or about the same size as the average diameter of the particulate material being conveyed. In embodiments, the average diameter of the micropores in the microporous material can be from about 0.01 to about 1,000 percent the average diameter size of the particulate material conveyed. Although not wanting to be limited by theory it is believed that the pores can be larger than the particles since the particulates does not make contact with the microporous wall material in view of the boundary layer established when gas pressure is applied. There is little or no tendency for the particulate material to clog or foul the micropores in the wall material while the gas pressure is being applied. Still further not wanting to be limited by theory it is believed that the boundary layer established between the interior wall and the particulate material is believed to be proportionately smaller and more uniformly distributed as the size of the pores decreases.

The micropores in the microporous material can be randomly distributed and produce micro-air jets which randomly project their respective gas streams toward the interior hollow chamber.

Alternatively, the micropores can be uniformly distributed on the surface of the microporous material and produce micro-jet gas streams which project their respective streams toward the interior hollow chamber uniformly in a preferred direction, for example, at an angular orientation, and preferably in the desired direction of particle flow through the conduit article. Angular orientation of the micropores and their respective jet streams can measured and determined, for example, with respect to a cylindrical axis of the conduit as a reference, and can be, for example, at angles ranging from about 2 to about 70 degrees, and preferably from about 30 to about 60 degrees. The angularly oriented microporous material can be prepared by, for example, using oriented perforation methods, including mechanical puncturing, selective chemical dissolution or etching, or light perforators, such as numerically controlled lasers.

The collective angular orientation of the micropore and micro-jet gas streams can increase the particulate throughput rate through the conduit article compared to the aforementioned randomly oriented micro-jet gas streams. Although not wanting to be limited by theory, the improved throughput rate afforded by the oriented micropores is believed to be attributable to the resulting directed pneumatic motive force. The improved throughput rates for the oriented micropores can be, for example, from 0.1 to about 80 percent compared to a comparable conduit article with randomly oriented micropores in the gas permeable inner wall.

In embodiments the present invention provides an apparatus comprising:

a particulate source;

a fluidizing conduit substantially as described and illustrated herein, which is in communication with the particulate source and with gas permeable walls for fluidizing and controllably transporting the particulates from the source area or fluidizing area to an ultimate receiver vessel or subsequent unit operation;

a receiver module in communication with the fluidizing conduit adapted to receive the particulates from the conduit, and to optionally further condition the particle stream.

Further conditioning the particle stream can include, for example, appropriate depressurization and or flow regulation of the fluidized particulate stream.

The apparatus can further comprise a fluidizing ante-chamber module situated between the particle feed source and the fluidizing conduit adapted for fluidizing otherwise non-fluid particulates that are received from a particle feed source. The fluidizing ante-chamber module can receive and fluidized the particle material prior to conveyance to the conduit article.

The apparatus of the present invention can further comprise a low surface tension liner material, for example, in at least portions of the fluidizing conduit adapted to assist the transport of particulates from the source to the receiver, for example, at connection points between the source, fluidizing module, the conduit, and or between the conduit the receiver module.

Figure 1:
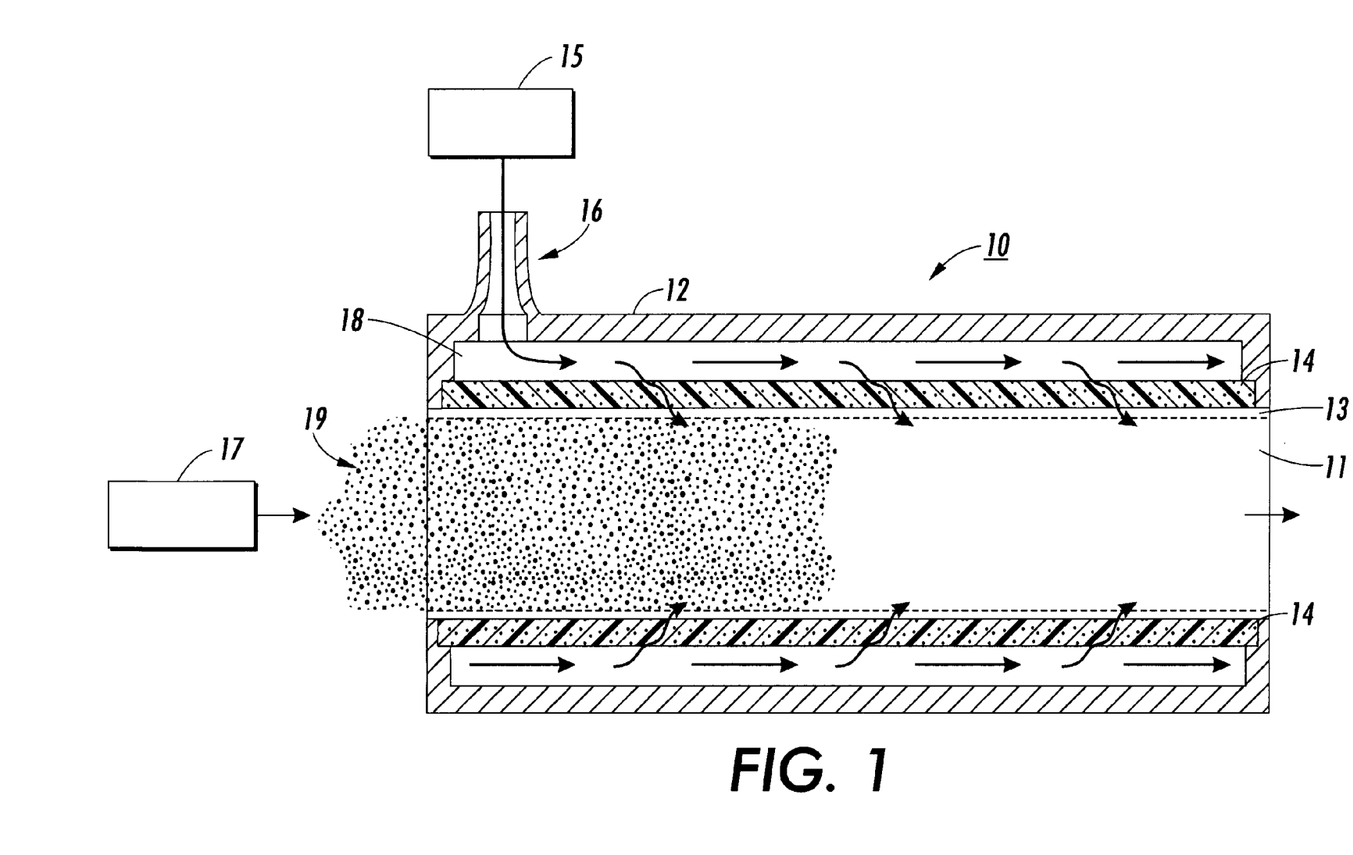

The receiver module can include a gas vent adapted to adjust the gas pressure of the particulate stream, for example, an out-gassing nozzle which permits gas egress but prevents or limits particulate egress. For example, the out-gas nozzle can be adapted to permit removal, for example, of objectionable fines and the like below specification or out-of-spec particulates. The vent can provide controllable dissipation of positive gas pressure in the apparatus and the particulate stream.

Alternatively or additionally, the out-gas nozzle can be adapted or supplemented to permit the introduction of various additives to the particle stream, such as surface additives or performance additives for xerographic toners. The receiver module can be further modified to include a vacuum line adapted to generate additional motive force for transporting particulate material. For example, when a fluidizing conduit is set in a horizontal orientation, additional force may be required to transport the particulate material, particularly for very dense particulates. The additional motive force can be obtained from, for example, optional positive gas pressure created in the fluidizing ante-chamber or a venturi eductor module situated before the conduit, or an optional vacuum source situated in receiver module after the conduit.

The orientation of the conduit between the source and the receiver module can in embodiments be substantially horizontal, in a variety of vertical inclines, and in a variety of vertical declines, and combinations thereof.-The ability to vary the directional orientation of the conduit or a series of linked conduits, and therefore the direction of the particulate process stream therein without the need to provide any additional external or internal motive forces, such as external magnets or an internal screw auger, provides the present invention with a number of operational and economical advantages compared to conventional particulate transport or conveyor systems.

The apparatus envisioned by the present can further include providing for two separate particulate sources that are each connected to a separate fluidizing conduit and which separate conduits conveys their respective particulate material streams to a single common receiver module. Other embodiments contemplate a plurality of separated sources each source being attached to at least one fluidizing conduit and wherein the respective particulate streams merge at a single common receiver module. For example, there can be selected from 2 to about 10 particulate sources and fluidizing conduit combinations that merge at a single common receiver module. Thus, for example, in an upward conveyor or a downward conveyor, two or more feed sources and their connecting particulate fluidizing conduits can converge or merge multiple particle streams into a single stream, to provide for efficient and continuous mixing of similar or different material, such as blending of colored toners, combining surface additives with toner particles, or mixing toner particles with carrier particles. When highly dense particulate materials are selected, such as metallic carrier core particles used in xerography, for transport and or mixing, a supplemental mechanical device, such as an auger or conveyor belt, can be selected for use in either the particulate source, the fluidizing ante-chamber, or the fluidizing conduit, and depending on the requirements of the material and processing desired.

The apparatus of the present invention can further comprise proportionately dividing the particulate stream at the receiver module to thereafter provide separate particulate streams.

Particulate materials can include, for example, powders, ultrafine metal oxide particulates such as $TiO_2$, $CeO_2$, $SiO_2$, and the like metal oxides, and surface treated metal oxide particulates, and mixtures thereof, where the surface treatment includes known organic and inorganic compounds, such as silicones, silanes, titanates and the like surface coatings and surface active and reactive materials. The particulate material can be toner particles, carrier particles, charge control additives, submicron metal oxides, surface treated metal oxides, dyes, pigments, resins, and mixtures thereof, and any other particulate material which can be sufficiently fluidized and conveyed as disclosed and illustrated herein, for example, agricultural products, food stuffs, pharmaceuticals, cosmetics, and the like particulate materials.

The toner particles can include known resin and colorant components, and the toner particles have average particle sizes, for example, of from about 2 to about 50 microns. The particulate material can also include xerographic developer materials including toner and carrier particles.

The gas pressure can be, for example, from about 2 to about 100 pounds per square inch and gas flow rate can be, for example, from about 0.1 to about 50 standard cubic feet per hour (scfh), and which gas parameters can be readily adjusted and regulated by, for example, an operator or automatically by a programmable computer controller.

"Fluidizing" as used in the present invention refers to increasing the flowability of a substantially particulate material or admixture of particulate materials, and which particulate material does not include, for example, appreciable amounts a liquid carrier vehicle or solvent. Appreciable amounts means, for example, sufficient amounts of liquid to form a slurry or a liquid suspension of the particulate material. However, the particulate material can contain minor amounts or traces of liquids which can be evaporated from or dispersed in the particulate components of the fluidized stream and optionally removed from particulate stream by appropriate separation of the gas component containing any liquid vapor or aerosolized liquid particles.

Referring to the Figures, FIG. 1 shows a cross-section of an exemplary fluidizing conduit article (10) of the present invention with solid outer wall (12), a gas permeable porous interior wall or interior wall (14), compressed gas inlet nozzle (16), a gas distribution and transport chamber (18), and an internal chamber (11) for transporting particulate materials. Fluidized particulates (19) enter the aerating conduit article (10) at one end while compressed gas from an external source (15) simultaneously and continuously enters the gas distribution chamber (18) where the gas pressure equilibrates within the chamber and permeates the porous interior wall (14) to further fluidize the particulate material

(19) within the article (10) and urge the passage of particulates through the conduit. Although not wanting to be limited by theory it is believed that the gas pressure substantially uniformly flows through the interior porous wall and forces particulate material (19) to "float" or "levitate" away from the porous walls and towards the center of the conduit, and creates a near frictionless or substantially frictionless air boundary layer between the particulate dispersion (19) and the gas permeable porous interior wall (14) to effectively provide an "air bearing (13) " or boundary layer effect which facilitates the transport of particulates through the conduit article.

Figure 2:
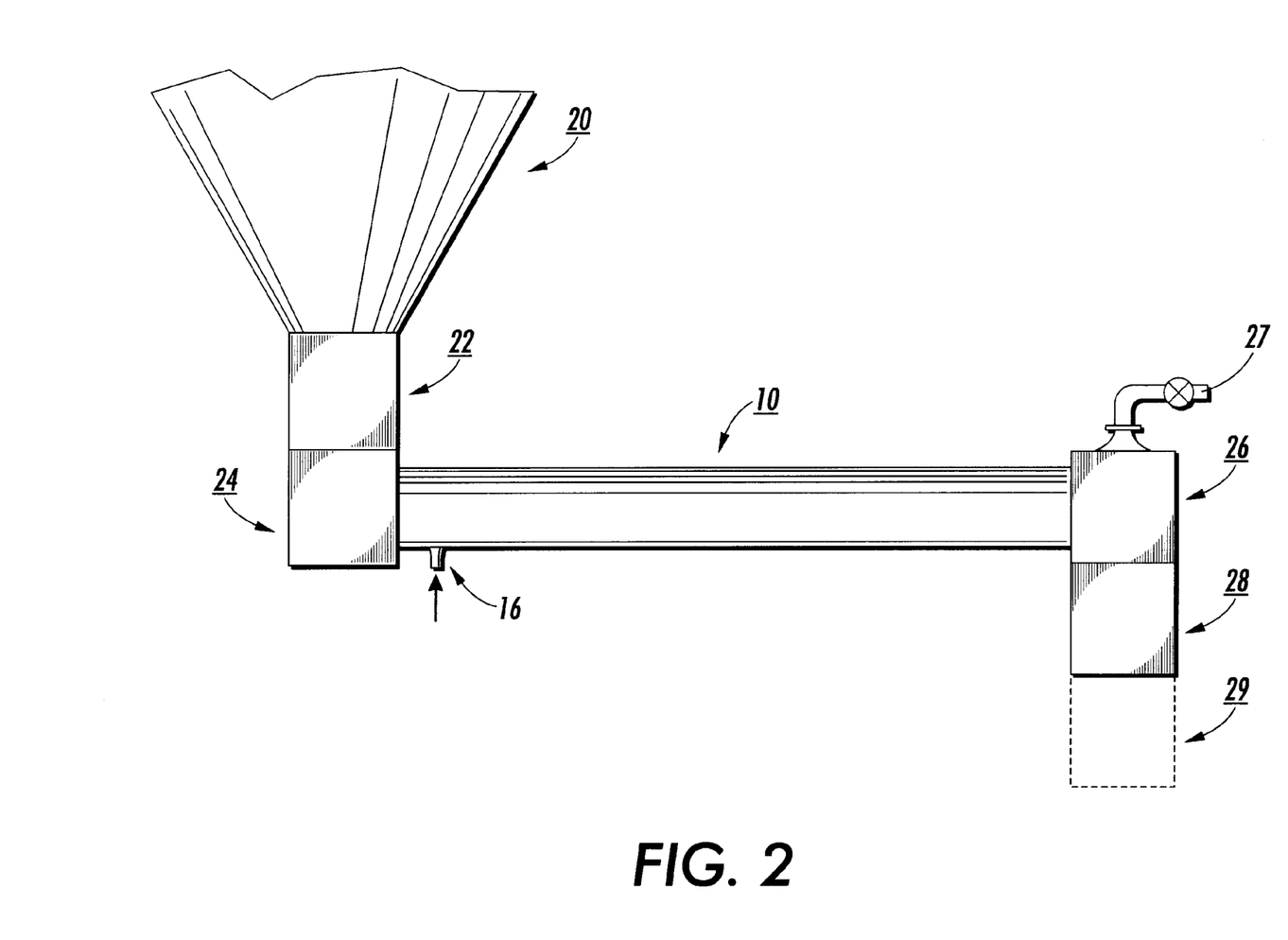

FIG. 2 shows a view of an exemplary horizontally oriented conveyor system incorporating an fluidizing conduit article (10) with gas nozzle (16) and including attachment of the article (10) to a particulate material source hopper (20), source-feeder (22), and optional fluidizing module (24). The conduit article (10) urges the transport of the fluidized particulate material from the fluidizing module (24) to an optional receiver module (26) deaerator which module receives the particulate material and can optionally permit dissipation of gas pressure without the escape of particulate material, for example with an appropriately sized screened vent (27) to effectively provide deaerator capability to the apparatus. The receiver module (26) communicates the particulates, for example by gravity or with particle metering means, such as a baffle that can separate out and deliver apportioned amounts of particles, to the adjacent filler module (28) which can optionally be adapted to effectively controllably value the flow of particulates to a receiver vessel (29), such as a toner bottle, an extruder, or another piece of unit operation equipment or stage, such as a bag house or classifier, for example, in either a continuous or batch type filling or transport operation.

The receiver module (26) can optionally include an adapter for a vacuum line where the vacuum line can further condition the resulting pressure in the particle stream. It will be readily appreciated by one of ordinary skill in the art that the vacuum line adapter can simultaneously be the above mentioned vent (27) or the vacuum line adapter can be a separate and distinct adapter similar or identical to (27).

Figure 3:
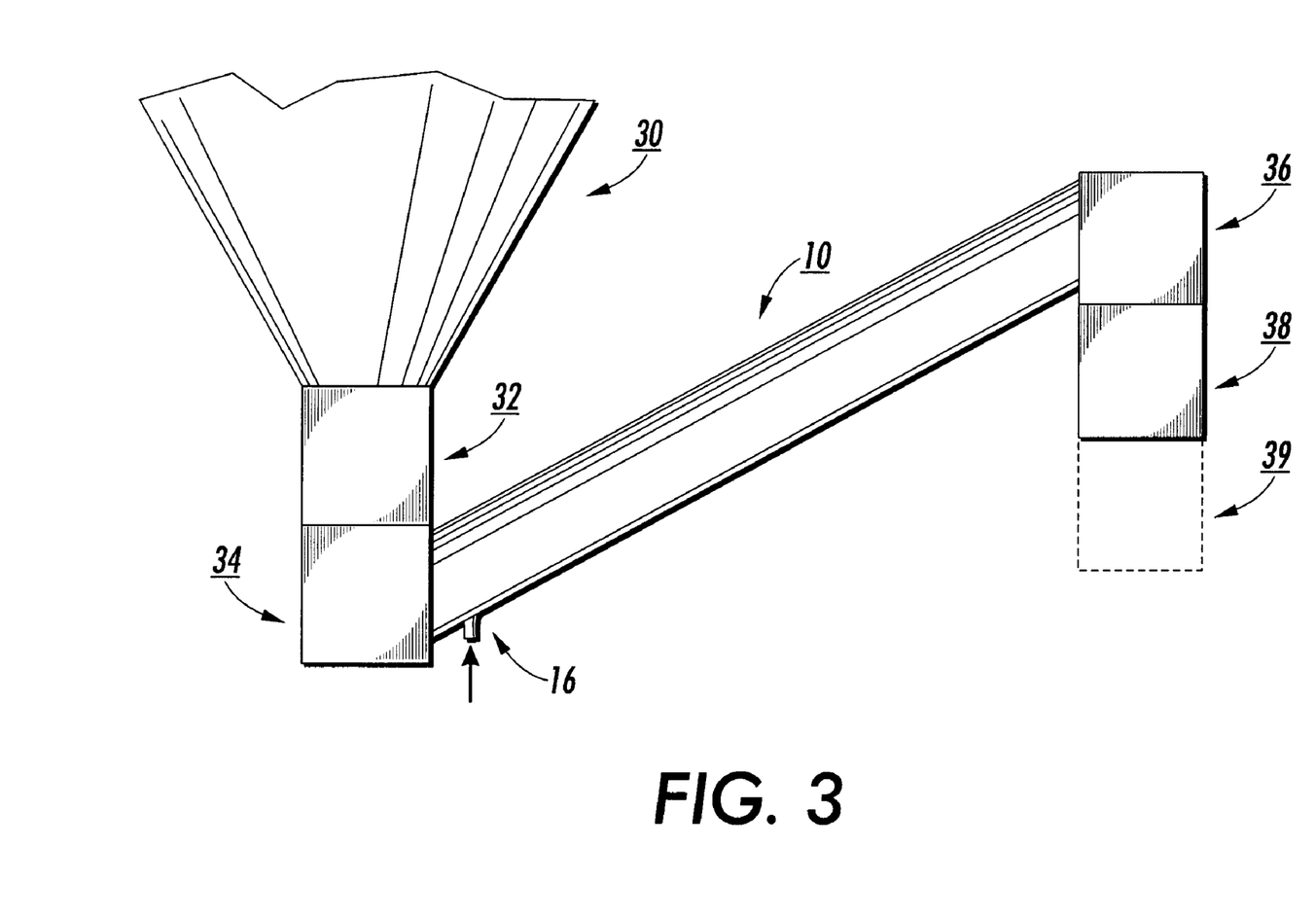

FIG. 3 shows in another embodiment a view of a vertically inclined, that is, a non-horizontal conveyor system of the present invention incorporating a fluidizing conduit article for the purpose vertically (or alternatively declining; not shown) conveying particulate material analogous the horizontal embodiment in FIG. 2, including an fluidizing conduit article (10) with gas nozzle (16) an attached particulate material source hopper (30), source-feeder (32) and fluidizing module (34). The fluidizing conduit article (10) urges the transport of the fluidized particulate material from the fluidizing module (34) to a receiver module (36) which receives the particulate material and can optionally permit dissipation of gas pressure without the escape of particulate material, for example with an appropriately sized screen or vent (not shown). The receiver module (36) communicates the particulates, for example by gravity or with particle metering means as described above, to the adjacent filler module (38) which can optionally be adapted to effectively controllably value the flow of particulates to an optional receiver vessel (39). The conduit (10) is preferably adapted to modules (34) and (36) so as to eliminate any "dead zones", such as abrupt bends in conduit (10), or non-smooth and non-continuous surfaces which contact the particulate powder.

Figure 4:
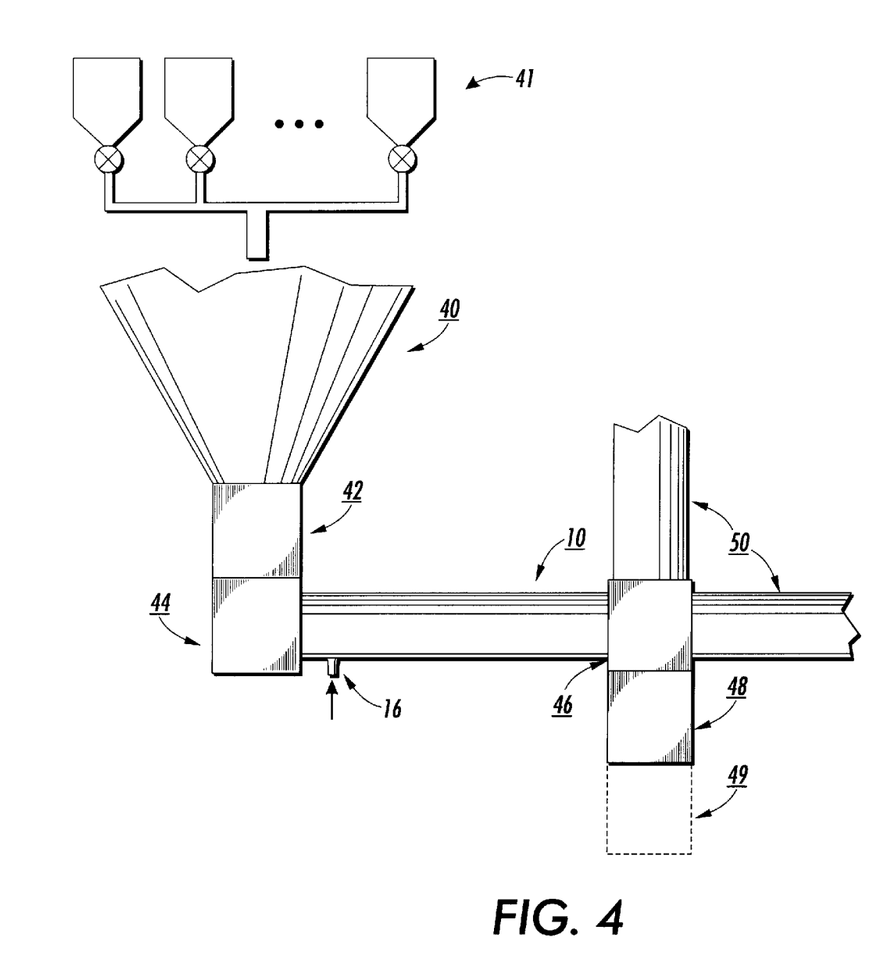

FIG. 4 shows in another embodiment a view of a conduit conveyor system of the present invention incorporating a plurality of fluidizing conduit articles (10) and (50) for the purpose of conveying multiple particulate streams into a common manifold (46), for example for combining or mixing like or dissimilar particulate streams. Analogously to FIGS. 2 and 3 described above the conveyor system can include an fluidizing conduit article (10) with gas nozzle (16), an attached particulate material source hopper (40), source-feeder (42), and fluidizing module (44). The fluidizing conduit article (10) urges the transport of the fluidized particulate material from the fluidizing module (44) to a common receiver module (46) which receives the particulate material provided by hopper (40) and other particulate sources (41) for example from about 2 to about 10 sources, and can optionally permit dissipation of gas pressure without the escape of particulate material, for example with an appropriately sized screen or vent (not shown). The receiver module (46) communicates the particulates, for example by gravity or with particle metering means or redirecting entrained gas, to the adjacent filler module (48) which can optionally be adapted to effectively and controllably value the flow of particulates to an optional receiver vessel (49). The conduit (10) is preferably adapted to modules (44) and (46) so as to eliminate any "dead zones", such as abrupt bends in transport conduits (10) or non-smooth and non-continuous surfaces which contact the particulate powder.

In embodiments the particulate material can be non-magnetic, magnetic, and mixtures thereof, such as a toner including a resin and a colorant, such as magnetite, and which toner particles have an average particle size of from about 2 to about 50 microns. The particulate material can also be a developer material including a mixture of magnetic or non-magnetic toner particles and magnetic or non-magnetic carrier particles.

At least a portion of inner surface of the conduit can be coated or lined with a material having a low coefficient of friction, that is a liner or coating having at least an outer surface that contacts the particulate material, with a coefficient of friction of from about 0.10 to about 0.25. Examples of preferred liners are polytetrafluoroethylene, nylon, and the like low or non-stick materials. In a preferred embodiment a low friction sleeve, liner, or coating, resides on at least a portion of the inner surface of the conduit and adjacent to the nozzle. It will be appreciated that in embodiments the entire conduit can be lined with a low friction material, or alternatively, the conduit itself can be constructed of a low friction material in lieu of a low friction liner material so long as the microporous and gas permeable conditions of the inner wall are satisfied.

The method and apparatus as illustrated herein can provide a substantially more uniform material feed thus reducing undesired variability compared to conventional feed and conveyor systems. The present invention enables increased particle throughput efficiency, alone or in conjunction with other process equipment.

The present invention is applicable to many particulate feed, discharge, and fill operations, for example, toner fill operations and reliably combining toner and the like constituents in for example, pre-extrusion and extrusion operations. Thus, the receiver module or subsequent modules can be, for example, an extruder, a melt mixing device, a classifier, a blender, a screener, a variable rate toner filler, a bottle, a cartridge, a container for particulate toner or developer materials, and the like static or dynamic particulate receptacles. It is readily appreciated that the present invention is not limited to toner and developer materials, and is well suited for any powder or particulate material, for example, cement, flour, cocoa, herbicides, pesticides, minerals, metals, pharmaceuticals, and the like materials.

The article, apparatus and methods of the present invention allow particulate materials including toners to be dispensed, mixed, and transported more accurately and more rapidly than prior art systems and can also insure that, for example, a melt mix apparatus or a toner container is filled accurately, quickly, cleanly, completely, and in proper proportion.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

The conveyor apparatus substantially as shown in FIG. 2 and incorporating the article of FIG. 1, is used to convey metal oxide particles with an average particle size of about 100 to about 800 nanometers, such as titanium dioxide or cerium oxide. The internal porous wall is constructed of a filter media known as POREX® which is commercially available from Porex Technologies, Fairburn, Ga. The POREX® material is a highly porous, high-density polyethylene, with an average pore size of about 7 to about 40 microns. Alternatively, other materials can be selected, such as polytetrafluoroethylene (PTFE) with an average pore size of about 25 microns, or a polyester such as NYLON 6, with a median pore size of about 200 microns. The conveyor apparatus is operated continuously for about a 400 hour period without any objectionable interruption in smooth flow and high throughput of particulates. No shutdown or clean-out step is needed during the period of operation.

COMPARATIVE EXAMPLE I

Example I was repeated with the exception that the internal porous wall was substituted with a nonporous TEFLON® liner with a wall thickness of about 1.0 millimeter. The conveyor apparatus operated for about 6 hours and had to be shut down as the particulate material was apparently blocking badly within the conveyor and output was either greatly reduced or stopped entirely. A manual clean-out step was needed before the conveyor could be restarted.

COMPARATIVE EXAMPLE II

Comparative Example I was repeated with the exception that additionally one or more mechanical vibrators were applied to various points of the exterior walls of the operating conveyor or conduit article portion for the purpose of preventing blocking of the conveyor and avoiding concomitant shut down. The conveyor apparatus operated for about 1 hour before being shut down due to particulate material blocking conveyor flow and reducing throughput.

Other modifications of the present invention may occur to those skilled in the art based upon a review of the present application and these modifications, including equivalents thereof, are intended to be included within the scope of the present invention.

What is claimed is:

1. A device comprising:
   a conduit which transports particulate material from the first open end to the second open end of the conduit via an integral interior hollow chamber where the conduit comprises:
   a gas impermeable rigid outer wall;
   a gas permeable rigid inner wall with the gas permeability of the inner wall optionally oriented toward the second open end;
   a compressed gas inlet nozzle which traverses the outer wall;
   an annular gas distribution chamber situated between the outer wall and the inner wall; and
   a gas pressure source attached to the gas inlet nozzle which conveys gas pressure to the gas distribution chamber and through the gas permeable inner wall.

2. A device in accordance with claim 1, wherein the gas pressure traverses the gas permeable inner wall and is directed towards the interior chamber of the conduit and the particulates.

3. A device in accordance with claim 1, wherein the gas pressure traverses the inner wall and urges the particulate material in the interior hollow chamber through the conduit.

4. A device in accordance with claim 1, wherein the gas pressure traverses the inner wall and forms a gaseous and substantially friction-less boundary layer between the gas permeable inner wall and the particulate material in the interior hollow chamber.

5. A device in accordance with claim 1, wherein the inner wall is a microporous material which consists of micropores with an average pore diameter of from about 7 to about 250 microns.

6. A device in accordance with claim 6, wherein the average diameter of the micropores in the microporous material is from about 0.01 to about 1,000 percent the average diameter size of the particulate material conveyed.

7. A device comprising:
   a conduit which transports particulate material from the first open end to the second open end of the conduit via an integral interior hollow chamber where the conduit comprises:
   a gas impermeable rigid outer wall;
   a gas permeable rigid inner wall;
   a compressed gas inlet nozzle which traverses the outer wall;
   an annular gas distribution chamber situated between the outer wall and the inner wall; and
   a gas pressure source attached to the gas inlet nozzle which conveys gas pressure to the gas distribution chamber and uniformly through the gas permeable inner wall, wherein the gas permeable inner wall is a microporous material selected from the group consisting of a porous polymer, a powdered metal, a microscopically perforated metal sheet, a microscopically perforated plastic, a microscopically perforated cellulose, a sintered metal oxide, and combinations thereof, and wherein the micropores in the microporous material are randomly distributed and produce micro-air jets which project their respective gas streams randomly toward the interior hollow chamber.

8. A device comprising:
   a conduit which transports particulate material from the first open end to the second open end of the conduit via an integral interior hollow chamber where the conduit comprises:
   a gas impermeable rigid outer wall;
   a gas permeable rigid inner wall;
   a compressed gas inlet nozzle which traverses the outer wall;
   an annular gas distribution chamber situated between the outer wall and the inner wall; and a gas pressure source attached to the gas inlet nozzle which conveys gas pressure to the gas distribution chamber and uniformly through the gas permeable inner wall, wherein the gas permeable inner wall is a microporous material selected from the group consisting of a porous polymer, a powdered metal, a microscopically perforated metal sheet, a microscopically perforated plastic, a microscopically perforated cellulose, a sintered metal oxide, and combinations thereof, and wherein the micropores are uniformly distributed on the surface of the microporous material and produce micro-jet gas streams which project their respective streams toward the interior hollow chamber at an angular orientation toward the second end.

9. A device in accordance with claim 8, wherein the collective angular orientation of the micro-jet gas streams toward the second end increase the particulate throughput rate compared to randomly oriented micro-jet gas streams by from 0.1 to about 80 percent.

10. An apparatus comprising:

a particulate material source;

a fluidizing device which transports particulate material from the first open end to the second open end of the conduit via an integral interior hollow chamber where the conduit comprises:

a gas impermeable rigid outer wall;

a gas permeable rigid inner wall with the gas permeability of the inner wall optionally oriented toward the second open end;

a compressed gas inlet nozzle which traverses the outer wall;

an annular gas distribution chamber situated between the outer wall and the inner wall;

a gas pressure source attached to the gas inlet nozzle which conveys gas pressure to the gas distribution chamber and uniformly through the gas permeable inner wall, and a receiver module attached to the fluidizing device and which receiver module receives the particulates from the second end of the conduit, wherein the receiver module includes a gas vent adapted to adjust the resulting gas pressure of the particulate stream.

11. An apparatus in accordance with claim 10, wherein the receiver module further comprises a vacuum line which line conditions the resulting pressure in the particle stream.

12. An apparatus comprising:

a particulate material source;

a fluidizing conduit which transports particulate material from the material source at the first end to the second open of the conduit via an integral interior hollow chamber where the conduit comprises:

a gas impermeable rigid outer wall;

a gas permeable rigid inner wall with the gas permeability of the inner wall oriented toward the second open end;

a compressed gas inlet nozzle which traverses the outer wall;

an annular gas distribution chamber situated between the outer wall and the inner wall;

a gas pressure source attached to the gas inlet nozzle which conveys gas pressure to the gas distribution chamber and uniformly through the gas permeable inner wall, and a receiver module attached to the fluidizing conduit at the second end and which module receives the particulates from the second end of the conduit.

13. An apparatus in accordance with claim 10, further comprising a fluidizing ante-chamber module situated between the particle source feed and the fluidizing conduit adapted for fluidizing otherwise non-fluid particulates from the particle source feed.

14. An apparatus in accordance with claim 12, wherein the orientation of the device between the source and the receiver module is substantially horizontal, vertically inclined, or vertically declined.

15. An apparatus in accordance with claim 12, wherein the receiver has at least two outbound conduits attached thereto which proportionately divide the inbound particulate stream at the receiver into separate particulate streams.

16. An apparatus in accordance with claim 12, wherein the particulate material is selected from the group consisting of toner particles, carrier particles, charge control additives, submicron metal oxides, surface treated metal oxides, dyes, pigments, resins, and mixtures thereof.

17. An apparatus in accordance with claim 12, wherein the gas pressure is from about 2 to about 100 pounds per square inch and gas flow rate of about 0.1 to about 50 standard cubic feet per hour (scfh).

18. An apparatus in accordance with claim 12, further comprising providing a combination of at least two particulate sources, wherein each source communicates with a fluidizing conduit, and wherein the combination conveys particulate materials from the respective particulate sources to a single common receiver module.

19. An apparatus in accordance with claim 18, wherein from 2 to about 10 particulate source and fluidizing conduit combinations are selected.

* * * * *